Reissued Aug. 18, 1953 Re. 23,700

UNITED STATES PATENT OFFICE 23,700

DENTAL IMPRESSION COMPOSITION

Edwin H. Lochridge, Glendale, Calif., assignor to Dental Perfection Company, a company of California No Drawing. Original No. 2,568,752, dated September 25, 1951, Serial No. 764,247, July 28, 1947. Application for reissue January 21, 1953, Serial No. 332,581

28 Claims. (Cl. 18—47)

Matter enclosed in heavy brackets [ ] appears in the original patent but forms no part of this reissue specification; matter printed in italics indicates the additions made by reissue.

This invention relates to a new dental impression compound and the method of producing the same.

For many dental purposes such as making of full dentures, partial dentures, bridges, etc., it is necessary for the dentist to be able to accurately reproduce portions of the mouth of the subject. Such reproductions often involve the duplication of undercuts of more or less severity, as for instance in the case where a tooth or teeth have been extracted and the adjacent teeth have crowded together.

For many years dental impressions have been taken with materials such as plaster of Paris, or various shellac or wax compositions. These materials have little or no elasticity and while it is not difficult to take some impressions with them, such as for most full dentures, it is not possible to reproduce accurately undercuts without either breaking the impression and re-assembling it, as is done with plaster, or taking the impression in sections, as is the practice in the use of shellac and wax compounds. The foregoing methods obviously involve time and there is the danger of inaccuracy, as well as discomfort to the patient.

My dental impression material is composed of a suitable gel forming agent, such as sodium, potassium or ammonium alginate, sodium methylcarboxycellulose or sodium, potassium or ammonium pectate. Mixtures of the foregoing gel forming agents may be used in my new composition.

To the above gel forming agent there is added lead monosilicate. I have found that lead monosilicate is especially desirable in my composition since it eliminates the necessity of a setting agent, such as calcium sulphate. All forms of lead silicate do not give satisfactory results in my composition. For example, I have found that lead bisilicate will not produce a satisfactory impression material when used in my composition. The difference in behavior of lead monosilicate and lead bisilicate will be apparent by reference to the examples in the specification.

To the above composition I also add a fluosilicate. Most fluosilicates appear to give satisfactory results, however, I prefer to use sodium fluosilicate, aluminum fluosilicate and ammonium fluosilicate.

To the foregoing compounds I also add a filler, such as diatomaceous earth in a finely ground form. Other fillers, such as fuller's earth or talc may also be used.

I also add an alkali metal carbonate, such as sodium or potassium carbonate. Or in place of the carbonate I may add a water soluble phosphate. Many phosphates work satisfactorily, for example, I may use trisodium phosphate, sodium metaphosphate, potassium diphosphate, primary sodium phosphate or sodium acid pyrophosphate, however, I find that tetrasodium pyrophosphate works especially well. In using any of the foregoing phosphates or carbonates in my composition caution must be exercised in the amount employed since the final composition is very sensitive to a change in the amount of these ingredients employed. The use of either too much phosphate or carbonate tends to retard or inhibit the set in the final composition.

To the foregoing I add sufficient water to form a stiff paste when spatulated (mixed) and then place this paste into the dental tray for taking the impression.

It is, therefore, an object of the present invention to produce a composition of matter suitable and useful as a dental impression material by blending a suitable filler with lead monosilicate, a fluosilicate, a gel forming agent, such as an alkali metal alginate, pectin, pectin methoxyl, an alkali metal pectate or an alkali metal salt of methyl carboxycellulose, an alkali metal carbonate or a phosphate and water.

The following compositions are modifications of the impression material made according to my invention. These compositions were blended by rolling in a small jar mill:

Example I

| Grams | Material |
|---|---|
| 60 | Diatomaceous earth. |
| 40 | Exfoliated Pearlite (200 mesh). |
| 200 | Lead monosilicate. |
| 18 | Potassium alginate. |
| 4 | Tetrasodium pyrophosphate. |
| 10 | Sodium fluosilicate. |

Sixteen grams of the foregoing blended composition were thoroughly mixed with 25 cubic centimeters of water (70° F.) in a rubber mixing vessel with a spatula, after which the contents of the mixing vessel were transferred to the surface of a glazed tile. After 2½ minutes the mixture placed on the tile had become firmly set.

Example II

| Grams | Material |
|---|---|
| 80 | Diatomaceous earth. |
| 20 | Water floated exfoliated Pearlite ground and screened to 200 mesh. |
| 200 | Lead monosilicate. |
| 18 | Potassium alginate. |
| 10 | Sodium alginate (medicinal purity). |
| 20 | Aluminum fluosilicate. |
| 4 | Tetrasodium pyrophosphate. |

Sixteen grams of the foregoing composition were mixed, as in Example I, with 25 cubic centimeters of water (at 70° F.) and placed on a glazed tile. After 3 minutes the mixture placed on the tile had become firmly set.

Example III

| Grams | Material |
|---|---|
| 90 | Diatomaceous earth. |
| 200 | Lead monosilicate. |
| 18 | Potassium alginate. |
| 10 | Sodium alginate (medicinal purity). |
| 4 | Tetrasodium pyrophosphate. |
| 25 | Aluminum fluosilicate. |

Thirty-two grams of the above blend were mixed with 50 cubic centimeters of water (at 70° F.) and the mixture was transferred to a glazed tile. After 2¾ minutes this mixture placed on the tile had become firmly set.

Example IV

The following basic blend was mixed in a small jar mill:

| Grams | Material |
|---|---|
| 4.5 | Diatomaceous earth. |
| 0.9 | Potassium alginate. |
| 0.5 | Sodium alginate. |
| 0.2 | Tetrasodium pyrophosphate. |
| 1.25 | Aluminum fluosilicate. |
| 7.35 | |

(A) 5 grams of lead monosilicate were added to 7.35 grams of the above basic blend and the resultant mixture was spatulated with 25 cubic centimeters of water (at 70° F.) This spatulated mixture when placed upon a glazed tile produced a good set at the end of six minutes.

(B) 4 grams of lead monosilicate were added to 7.35 grams of the above basic blend and the resultant mixture was spatulated with 25 cubic centimeters of water (at 70° F.). This spatulated mixture when placed upon a glazed tile produced a good set after six minutes.

(C) 3 grams of lead monosilicate were added to 7.35 grams of the above basic blend and the resultant mixture was spatulated with 25 cubic centimeters of water (at 70° F.). This spatulated mixture was placed upon a glazed tile and a fair set was obtained in six minutes.

(D) 2 grams of lead monosilicate were added to 7.35 grams of the above basic blend and the resultant mixture was spatulated with 25 cubic centimeters of water (at 70° F.). The spatulated mixture was placed upon a glazed tile and after 25 minutes this composition was only slightly set and had a very poor texture.

(E) 5, 10 and 20 grams, respectively, of lead bisilicate were added to three 7.35 gram portions of the above basic mixture. 25 cubic centimeters of water were added to each mixture and after spatulation each resulting composition was placed on a separate glazed tile. After remaining 30 minutes on the tile none of these spatulated compositions had set. Each composition was still in the form of a mush or paste.

Example V

The following basic blend was mixed in a small jar mill:

| Grams | Material |
|---|---|
| 4.50 | Diatomaceous earth. |
| 0.90 | Potassium alginate. |
| 0.50 | Sodium alginate. |
| 0.20 | Tetrasodium pyrophosphate. |
| 0.75 | Sodium fluosilicate. |
| 6.85 | |

(A) 5 grams of lead monosilicate were added to 6.85 grams of the above basic blend and the resultant mixture was spatulated with 25 cubic centimeters of water (at 70° F.). The spatulated mixture was placed upon a glazed tile and 2½ minutes after spatulation had produced a good set.

(B) 4 grams of lead monosilicate were added to 6.85 grams of the above basic blend and the resultant mixture was spatulated with 25 cubic centimeters of water (at 70° F.). The spatulated mixture when placed upon a glazed tile produced a good set in six minutes.

(C) 3 grams of lead monosilicate were mixed with 6.85 grams of the above basic blend and 25 cubic centimeters of water (at 70° F.) were then added. After spatulation this mixture was placed upon a glazed tile and produced a fair set after six minutes.

(D) 2 grams of lead monosilicate were mixed with 6.85 grams of the above basic blend, 25 cubic centimeters of water (at 70° F.) were added and after spatulation (mixing) this mixture was placed upon a glazed tile. After a period of 20 minutes this composition was very fragile.

(E) 20 grams of lead bisilicate were added to 6.85 grams of the foregoing basic blend, 25 cubic centimeters of water (at 70° F.) were added and the mixture thoroughly spatulated. After twenty minutes from the time of spatulation the composition was still mushy.

Example VI

The following basic blend was made by rolling the constituents in a small jar mill.

| Grams | Material |
|---|---|
| 4.5 | Diatomaceous earth. |
| 1.8 | Potassium alginate. |
| 0.2 | Tetrasodium pyrophosphate. |
| 1.0 | Sodium fluosilicate. |
| 7.5 | |

(A) 5 grams of lead monosilicate were mixed with 7.5 grams of the above basic blend, 25 cubic centimeters of water (at 70° F.) were added and the mixture thoroughly spatulated. The spatulated mixture produced a good set in three and one-half minutes.

(B) The foregoing experiment (Example VI (A)) was repeated using 4, 3 and 2 grams, respectively, in three separate 7.5 gram portions of the basic blend with 25 cubic centimeters of water (at 70° F.) with the following results:

(1) The final composition with 4 grams of lead monosilicate and 7.5 grams of the basic blend produced a fair set in six minutes.

(2) The final composition with 3 grams of lead monosilicate and 7.5 grams of the basic blend set in ten minutes to a mushy consistency.

(3) The final composition with 2 grams of lead monosilicate and 7.5 grams of the basic blend had a very mushy consistency after ten minutes.

(C) The foregoing experiment (Example VI (A)) was repeated substituting 20 grams of lead bisilicate in place of the 5 grams of lead monosilicate. The final composition was still mushy and unsatisfactory 30 minutes after spatulation.

Example VII

The following blend was made by mixing the constituents in a small jar mill:

| Grams | Material |
|---|---|
| 4.50 | Diatomaceous earth. |
| 1.80 | Potassium alginate. |
| 0.20 | Tetrasodium pyrophosphate. |
| 3.25 | Aluminum fluosilicate. |
| 10.00 | Lead monosilicate. |
| 19.75 | |

The above mixture was spatulated with 25 cubic centimeters of water (at 70° F.) and after three minutes produced a very satisfactory set.

Example VIII

The following basic formula was made by mixing the ingredients in a small jar mill:

| Grams | Material |
|---|---|
| 4.5 | Diatomaceous earth. |
| 0.9 | Sodium alginate (low viscosity). |
| 0.5 | Sodium alginate (medicinal purity). |
| 0.2 | Tetrasodium pyrophosphate. |
| 1.0 | Aluminum fluosilicate. |
| 7.1 | |

(A) 5.0 grams of lead monosilicate were mixed with 7.1 grams of the above basic blend together with 25 cubic centimeters of water (at 70° F.). Six minutes after mixing this composition produced a good set.

(B) The foregoing experiment (Example VIII (A)) was repeated using 4, 3 and 2 gram portions of lead monosilicate, respectively with three separate 7.1 gram portions of the basic blend and with 25 cubic centimeters of water (at 70° F.) in each produced the following results:

(1) The composition containing 4 grams of lead monosilicate with 7.1 grams of the basic blend produced a good set in six minutes.

(2) The composition containing 3 grams of lead monosilicate with 7.1 grams of the basic mixture produced a fair set in eight minutes.

(3) The composition containing 2 grams of lead monosilicate with 7.1 grams of the basic blend was mushy and unsatisfactory after fifteen minutes.

(C) 20.0 grams of lead bisilicate were mixed with 7.1 grams of the above basic blend and 25 cubic centimeters of water (at 70° F.). After fifteen minutes this composition had produced a weak set and was unsatisfactory.

Example IX

The following basic blend was made by mixing the constituents in a small jar mill:

| Grams | Material |
|---|---|
| 4.50 | Diatomaceous earth. |
| 0.90 | Sodium alginate (low viscosity). |
| 0.50 | Sodium alginate (medicinal purity). |
| 0.20 | Tetrasodium pyrophosphate. |
| 0.75 | Sodium fluosilicate. |
| 6.85 | |

(A) 5 grams of lead monosilicate were mixed with 6.85 grams of the above basic blend and with 25 cubic centimeters of water (at 70° F.). After six minutes this composition produced a good set.

(B) The above experiment (Example IX (A)) was repeated using 4 grams of lead monosilicate. This composition produced a good set in six minutes.

(C) The above experiment (Example IX (A)) was repeated using 3 grams of lead monosilicate. This composition produced a fair set in six minutes.

(D) The above experiment (Example IX (A)) was repeated using 2 grams of lead monosilicate. An unsatisfactory set was obtained at the end of twenty minutes.

(E) The above experiment (Example IX (A)) was repeated using 10 grams of lead monosilicate. A very good set was obtained in three minutes.

(F) The above experiment (Example IX (A)) was repeated using 20 grams of lead monosilicate. A good set was obtained in about three to four minutes.

(G) The above experiment (Example IX(A)) was repeated using 20 grams of lead bisilicate in place of the lead monosilicate. After thirty minutes this composition was still mushy and had not set.

Example X

The following basic blend was mixed in a small jar mill:

| Grams | Material |
|---|---|
| 4.50 | Diatomaceous earth. |
| 1.80 | Ammonium alginate. |
| 0.20 | Tetrasodium pyrophosphate. |
| 0.75 | Sodium fluosilicate. |
| 7.25 | |

(A) 5 grams of lead monosilicate were mixed with 7.25 grams of the above basic blend together with 25 cubic centimeters of water (at 70° F.). This composition produced a good set in one and one-half minutes after mixing.

(B) The above experiment (Example X (A)) was repeated using 4 grams of lead monosilicate. This composition produced a good set in two and one-half minutes after mixing.

(C) The above experiment (Example X (A)) was repeated using 3 grams of lead monosilicate. This composition was very fragile after six minutes from time of mixing the final composition.

(D) The above experiment (Example X (A)) was repeated using 2 grams of lead monosilicate. After standing for twenty minutes from the time of mixing the final composition this material was mushy and unsatisfactory.

(E) The above experiment (Example X (A)) was repeated using 20 grams of lead bisilicate in place of the monosilicate. After standing fifteen minutes this composition was still mushy and had not set.

Example XI

The following basic blend was made in a small jar mill:

| Grams | Material |
|---|---|
| 4.50 | Diatomaceous earth. |
| 1.80 | Ammonium alginate. |
| 0.20 | Tetrasodium pyrophosphate. |
| 1.25 | Aluminum fluosilicate. |
| 7.75 | |

(A) 5 grams of lead monosilicate were mixed with 7.75 grams of the above basic blend and with 25 cubic centimeters of water (at 70° F.). This composition produced a good set in two minutes.

(B) The above experiment (XI (A)) was repeated using 4 grams of lead monosilicate. This composition produced a good set in two and one-half minutes.

(C) The above experiment (XI (A)) was repeated using 3 grams of lead monosilicate. This composition was mushy and fragile after ten minutes from the time of mixing.

(D) The above experiment (XI (A)) was repeated using 2 grams of lead monosilicate. After standing twenty minutes this composition was very mushy and unsatisfactory.

(E) The above experiment (XI (A)) was repeated using 20 grams of lead bisilicate in place of the lead monosilicate. This composition was mushy after standing twenty minutes.

Example XII

The following basic blend was made in a small jar mill:

| Grams | Material |
|---|---|
| 4.5 | Diatomaceous earth. |
| 0.9 | Potassium alginate. |
| 0.5 | Sodium alginate (medicinal purity). |
| 0.6 | Sodium fluosilicate. |
| 5.0 | Lead monosilicate. |
| 11.5 | |

(A) 0.2 gram sodium carbonate (anhydrous) was mixed with 11.5 grams of the foregoing basic blend and with 25 cubic centimeters of water (at 70° F.). This composition produced a good set in three minutes.

(B) The above experiment (Example XII (A)) was repeated in which the sodium carbonate was replaced with 0.2 gram trisodium phosphate. This composition produced a good set in three minutes.

(C) The above experiment (Example XII (A)) was repeated in which the sodium carbonate was replaced by 0.2 gram of sodium meta phosphate. This composition produced a good set in two minutes.

(D) The above experiment (Example XII (A)) was repeated using 0.1 gram potassium diphosphate in place of the sodium carbonate. This composition produced a fair set in twenty minutes.

Example XIII

The following composition was blended:

| Grams | Material |
|---|---|
| 4.5 | Diatomaceous earth. |
| 5.0 | Lead monosilicate. |
| 0.9 | Sodium alginate (low viscosity). |
| 0.5 | Sodium alginate (medicinal purity). |
| 0.5 | Sodium fluosilicate. |
| 11.4 | |

To the above mixture there was added .05 gram primary sodium phosphate and 25 cubic centimeters of water and this composition was then thoroughly mixed. This composition produced a good set in two minutes.

Example XIV

The following basic blend was obtained by mixing in a small jar mill:

| Grams | Material |
|---|---|
| 90 | Diatomaceous earth. |
| 200 | Lead monosilicate. |
| 40 | Pectin methoxyl. |
| 4 | Tetrasodium pyrophosphate. |

(A) 19.5 of the above basic blend was mixed with .350 gram of aluminum fluosilicate and 25 cubic centimeters of water (at 70° F.) This composition produced a good set in six minutes.

(B) 21 grams of the above basic blend was mixed with 0.250 gram of sodium fluosilicate and 25 cubic centimeters of water (at 70° F.). This composition produced a good set in five minutes.

Example XV

The following ingredients were mixed together:

| Grams | Material |
|---|---|
| 4.50 | Diatomaceous earth. |
| 10.00 | Lead monosilicate. |
| 0.90 | Potassium alginate. |
| 0.50 | Sodium alginate (medicinal purity). |
| 0.20 | Tetrasodium pyrophosphate. |
| 0.25 | Sodium carboxymethyl cellulose. |
| 0.75 | Aluminum fluosilicate. |

The above basic blend was mixed with 25 cubic centimeters of water (at 70° F.). This composition produced a good set in seven minutes.

Example XVI

The following basic blend was mixed in a small jar mill:

| Grams | Material |
|---|---|
| 40.0 | Diatomaceous earth. |
| 150.0 | Lead monosilicate. |
| 10.0 | Sodium carboxymethyl cellulose. |

(A) 20 grams of the above basic blend were mixed with 0.5 gram aluminum fluosilicate and 25 cubic centimeters of water (at 70° F.). This composition set well in two and one-half minutes.

Example XVII

The following basic blend was made in a small jar mill:

| Grams | Material |
|---|---|
| 90.0 | Diatomaceous earth. |
| 200 | Lead monosilicate. |
| 18 | Potassium alginate. |
| 10 | Sodium alginate (medicinal purity). |
| 4 | Tetrasodium pyrophosphate. |
| 10 | Sodium fluosilicate. |

34 grams of the above composition were mixed with 50 cubic centimeters of water (at 70° F.). This composition produced a very satisfactory set in two and one-half minutes when placed upon a glazed tile.

To clarify what is meant by the term "setting time" in Examples I to XVII, inclusive, all of the compositions with the added water were mixed or spatulated in a flexible rubber cup with an ordinary steel spatula, after which the contents of the cup were placed upon a glazed tile. The times shown in the foregoing examples are taken from the time the water is added to the composition and start of spatulation.

In addition to using lead monosilicate I may also use lead disilicate. Both of these compounds are orthosilicates. Lead bisilicate is the metasilicate and, as stated above, is unsatisfactory in my composition.

I claim:

1. [A] *An impression* composition [of matter comprising] *convertible by mixing with water to an elastic gel consisting essentially of* an alkali metal *alginate,* [salt of a weak organic acid selected from the group consisting of pectic, alginic, and methylcarboxycellulose acids,] sodium fluosilicate and lead orthosilicate.

2. [A] *An impression* composition [of matter comprising] *convertible by mixing with water to an elastic gel consisting essentially of* an alkali metal alginate, sodium fluosilicate, lead orthosilicate and an alkali metal phosphate.

3. [A] *An impression* composition [of matter comprising] *convertible by mixing with water to an elastic gel consisting essentially of* an alkali metal alginate, sodium fluosilicate, lead orthosilicate and an alkali metal carbonate.

4. [A] *An impression* composition [of matter comprising] *convertible by mixing with water to an elastic gel consisting essentially of* an alkali metal *alginate,* [salt of a weak organic acid selected from the group consisting of pectic, alginic and methylcarboxycellulose acids,] a fluosilicate, lead monosilicate and an alkali metal phosphate.

5. [A] *An impression* composition [of matter comprising] *convertible by mixing with water to an elastic gel consisting essentially of* an alkali metal alginate, sodium fluosilicate, lead monosilicate, an alkali metal pyrophosphate and a filler.

6. [A] *An impression* composition [of matter comprising] *convertible by mixing with water to an elastic gel consisting essentially of* an alkali metal *alginate,* [salt of a weak organic acid selected from the group consisting of pectic, alginic and methylcarboxycellulose acids,] a fluosilicate, lead disilicate, an alkali metal carbonate and a filler.

7. [A] *An impression* composition [of matter comprising] *convertible by mixing with water to an elastic gel consisting essentially of* an alkali metal alginate, sodium fluosilicate, lead disilicate, an alkali metal phosphate and a filler.

8. [A] *An impression* composition [of matter comprising] *convertible by mixing with water to an elastic gel consisting essentially of* an alkali metal alginate, sodium fluosilicate, lead disilicate, an alkali metal pyrophosphate and a filler.

9. [A] *An impression* composition [of matter comprising] *convertible by mixing with water to an elastic gel consisting essentially of* an alkali metal alginate, sodium fluosilicate, at least 34.1% of lead monosilicate, an alkali metal pyrophosphate, and a filler.

10. [A] *An impression* composition [of matter comprising] *convertible by mixing with water to an elastic gel consisting essentially of* an alkali metal alginate, sodium fluosilicate, at least 34.1% of lead monosilicate, an alkali metal carbonate and a filler.

11. [A] *An impression* composition [of matter comprising] *convertible by mixing with water to an elastic gel consisting essentially of* an alkali metal *alginate,* [salt of a weak organic acid selected from the group consisting of pectic, alginic and methylcarboxycellulose acids,] a fluosilicate, lead monosilicate, a filler, and an alkali metal carbonate.

12. [A] *An impression* composition [of matter comprising] *convertible by mixing with water to an elastic gel consisting essentially of* an alkali metal *alginate,* [salt of a weak organic acid selected from the group consisting of pectic, alginic and methylcarboxycellulose acids,] a fluosilicate, lead disilicate, a filler and an alkali metal phosphate.

13. [A] *An impression* composition [of matter comprising] *convertible by mixing with water to an elastic gel consisting essentially of* an alkali metal alginate, sodium fluosilicate, lead monosilicate, an alkali metal phosphate and a filler in which composition the ratio of sodium fluosilicate to lead monosilicate is between 1 to 3 and 1 to 20.

14. [A] *An impression* composition [of matter comprising] *convertible by mixing with water to an elastic gel consisting essentially of* an alkali metal alginate, sodium fluosilicate, lead monosilicate, an alkali metal carbonate and a filler in which the ratio of sodium fluosilicate to lead monosilicate is between 1 to 3 and 1 to 20.

15. [A] *An impression* composition [of matter] as claimed in claim 4 in which the fluosilicate is aluminum fluosilicate.

16. [A] *An impression* composition [of matter] as claimed in claim 6 in which the fluosilicate is aluminum fluosilicate.

17. [A] *An impression* composition [of matter] as claimed in claim 11 in which the fluosilicate is aluminum fluosilicate.

18. [A] *An impression* composition [of matter] as claimed in claim 12 in which the fluosilicate is aluminum fluosilicate.

*19. An impression composition convertible by mixing with water to an elastic gel comprising an alkali metal salt of pectic acid, sodium fluosilicate and lead orthosilicate.*

*20. An impression composition convertible by mixing with water to an elastic gel comprising an alkali metal salt of pectic acid, a fluosilicate, lead monosilicate and an alkali metal phosphate.*

*21. An impression composition convertible by mixing with water to an elastic gel comprising an alkali metal salt of pectic acid, a fluosilicate, lead disilicate, an alkali metal carbonate and a filler.*

*22. An impression composition convertible by mixing with water to an elastic gel comprising an alkali metal salt of pectic acid, a fluosilicate, lead monosilicate, a filler and an alkali metal carbonate.*

*23. An impression composition convertible by mixing with water to an elastic gel comprising an alkali metal salt of pectic acid, a fluosilicate, lead disilicate, a filler and an alkali metal phosphate.*

*24. An impression composition convertible by mixing with water to an elastic gel comprising an alkali metal salt of methylcarboxycellulose, sodium fluosilicate and lead orthosilicate.*

*25. An impression composition convertible by mixing with water to an elastic gel comprising an alkali metal salt of methylcarboxycellulose, a fluosilicate, lead monosilicate and an alkali metal phosphate.*

*26. An impression composition convertible by mixing with water to an elastic gel comprising an alkali metal salt of methylcarboxycellulose, a fluosilicate, lead disilicate, an alkali metal carbonate and a filler.*

*27. An impression composition convertible by mixing with water to an elastic gel comprising an alkali metal salt of methylcarboxycellulose, a fluosilicate, lead monosilicate, a filler and an alkali metal carbonate.*

*28. An impression composition convertible by mixing with water to an elastic gel comprising an alkali metal salt of methylcarboxycellulose, a fluosilicate, lead disilicate, a filler and an alkali metal phosphate.*

EDWIN H. LOCHRIDGE.

References Cited in the file of this patent or the original patent

UNITED STATES PATENTS

| Number | Name | Date |
|---|---|---|
| 2,422,497 | Noyes | June 17, 1947 |
| 2,424,895 | Noyes | July 29, 1947 |
| 2,425,118 | Noyes | Aug. 5, 1947 |
| 2,434,005 | Noyes | Jan. 6, 1948 |